(12) United States Patent
Hu et al.

(10) Patent No.: US 8,825,723 B2
(45) Date of Patent: Sep. 2, 2014

(54) METHODS AND DEVICES FOR MANAGING AND EDITING FILES IN A FILE SYSTEM

(75) Inventors: Jian Qiang Hu, Beijing (CN); Xiao Long Zhang, Beijing (CN)

(73) Assignee: Thomson Licensing, Issy les Moulineaux (FR)

( * ) Notice: Subject to any disclaimer, the term of this patent is extended or adjusted under 35 U.S.C. 154(b) by 673 days.

(21) Appl. No.: 12/735,251

(22) PCT Filed: Nov. 19, 2008

(86) PCT No.: PCT/EP2008/065871
§ 371 (c)(1),
(2), (4) Date: Jun. 25, 2010

(87) PCT Pub. No.: WO2009/083337
PCT Pub. Date: Jul. 9, 2009

(65) Prior Publication Data
US 2010/0287218 A1 Nov. 11, 2010

(30) Foreign Application Priority Data
Dec. 27, 2007 (EP) .................................... 07301749

(51) Int. Cl.
*G06F 17/30* (2006.01)
(52) U.S. Cl.
USPC ........................................................ 707/822
(58) Field of Classification Search
CPC ............... G06F 17/30117; G06F 17/30138; G06F 17/30159
USPC .......................................... 707/822; 711/200
See application file for complete search history.

(56) References Cited

U.S. PATENT DOCUMENTS

| 2002/0091668 | A1* | 7/2002 | Karasudani | 707/707 |
| 2005/0008330 | A1* | 1/2005 | Uno | 386/52 |
| 2005/0283500 | A1* | 12/2005 | Eshghi et al. | 707/705 |
| 2006/0039678 | A1 | 2/2006 | Naka et al. | |
| 2006/0117071 | A1* | 6/2006 | Sobko | 707/705 |

FOREIGN PATENT DOCUMENTS

| EP | 1560218 | | 8/2005 |
| EP | 1560218 A1 * | 8/2005 |
| JP | 2002208222 | | 7/2002 |
| JP | 2003052006 | * | 2/2003 |
| JP | 2005033383 | | 2/2005 |

OTHER PUBLICATIONS

Search Rept: Jan. 29, 2009.

* cited by examiner

*Primary Examiner* — Robert Beausoliel, Jr.
*Assistant Examiner* — Alexandria Bromell
(74) *Attorney, Agent, or Firm* — Tutunjian & Bitetto, P.C.

(57) ABSTRACT

Methods and devices for managing and editing files in a file system are provided. In the method for managing data of a file in a file system, a storage space for storing the data of the file is divided into a plurality of blocks of identical size and sequentially numbered, wherein said blocks being organized in sequentially numbered chunks. And each chunk comprises at least one block. For a chunk, use first management data and second management data to record the size of space not occupied by data in the head part of the first block and in the end part of the last block of each chunk, subsequently to a deletion step of data within the file, the size of space being smaller than the size of a block.

14 Claims, 9 Drawing Sheets

METHODS AND DEVICES FOR MANAGING AND EDITING FILES IN A FILE SYSTEM

This application claims the benefit, under 35 U.S.C. §365 of International Application PCT/EP2008/065871, filed Nov. 19, 2008, which was published in accordance with PCT Article 21(2) on Jul. 9, 2009 in English and which claims the benefit of European patent application No. 07301749.3, filed Dec. 27, 2007.

TECHNICAL FIELD

This invention relates to the field of file storage devices, such for example Personal Video Recorders (PVRs). More particularly, this invention relates to methods and devices for managing and editing files in a file system.

BACKGROUND OF THE INVENTION

Nowadays, Personal Video Recorder (PVR) applications in set top boxes are widely used. Users sometimes need to edit their video records, for example, they need to delete a file to remove commercials. However, the commercials may be located anywhere in the video records, so the users may need to delete data from anywhere in the video record files. That is, the users may need to remove the commercials from the beginning, the middle, or the end of the video record files.

FIG. 1 is an example of a traditional file system, such as FAT 32 or EXT 2. In this file system, a file usually is stored in plurality of blocks. In FIG. 1, 10 blocks are used to store the file. A block is the smallest allocation unit, and contains 16 sectors. There are 512 bytes in a sector, so the size of a block usually is 8K bytes. In a sequential file, all blocks are linked together by the file management system. For each block, the link information may comprise the previous index, e.g. the number of the block coming before the current block, and the next index, e.g. the number of the block coming after the current block. Usually the file management system knows where a file starts, i.e. the number of the starting block, and the length of space which is occupied by the file, i.e. how many blocks are used to store this file. The real length of the file may be less than the length of the space occupied by the file.

In this traditional file system, it is easy to delete data from the end of the file, e.g. to remove commercials. If the file is deleted at its end, the deleted data will be released directly. However, it is difficult data from middle of the file, especially from parts of some blocks. If data is removed from part of the block, the block will not be a full one (non-full), i.e. there will be less than 8K of data in the block. In this condition, the traditional process method is to shift the data in the following blocks to fill the non-full block. The reason is that in the traditional file system, the file management system only registers the number of the starting block and the length of the file (i.e. how many blocks are used to store the file), so even some data has been removed from a block, some time will be taken to try to read out this part of the block. However, to shift the following blocks to fill the non-full block will take processing time, especially for a file with large size.

To solve problems existing in the traditional file system, JP 2003 052006 discloses an information editing controller for realizing high-speed editing by reducing a copy operation accompanied by read/write access to a medium in editing video and audio data.

SUMMARY OF THE INVENTION

In an aspect, a method for managing data of a file in a file system is provided. In the file system, a storage space for storing the data of the file is divided into a plurality of blocks of identical size and sequentially numbered. Said blocks are organized in sequentially numbered chunks, and each chunk comprises at least one block. For a chunk, the method comprises the step of using first management data and second management data to record the size of space not occupied by data in the head part of the first block and in the end part of the last block of each chunk, subsequently to a deletion step of data within the file, the size of space being smaller than the size of a block.

In an embodiment, the deletion step comprises deleting data from the head part or from the end part of the chunk.

In a detailed embodiment, chunks comprising data of a given file are linked, and the link information is recorded in file system management data.

Further, if a chunk is totally deleted, the storage space for the deleted chunk will be released and the chunks preceding and following the deleted chunk are linked.

In a second aspect, a method for managing data of a file in a file system is provided. In the file system, a storage space for storing the data of the file is divided into a plurality of blocks of identical size and sequentially numbered. Said blocks are organized in sequentially numbered chunks, and each chunk comprises at least one block. For a chunk, the method comprises the step of using first management data and second management data to record the size of space not occupied by data in the head part of the first block and in the end part of the last block of each chunk, subsequently to a deletion step of data within the file, the size of space being smaller than the size of a block. When part of the file is deleted, and the deletion starting position and ending position are not in a same block but within a same chunk, the chunk is separated into a first new chunk and a second new chunk. In this condition, third management data and fourth management data is used to record the size of empty space in the head part of the first block and that in the end part of the last block in the second new chunk respectively, and the first new chunk and the second new chunk are lined to keep the continuity of the file.

In an embodiment, the first new chunk is numbered by using the number of the initial chunk before deletion, and the second new chunk is numbered following the original last chunk in the file system.

In another embodiment, if data in a block is totally deleted, the space of the block is released.

In a third aspect, a method for managing data of a file in a file system is provided. In the file system, a storage space for storing the data of the file is divided into a plurality of blocks of identical size and sequentially numbered. Said blocks are organized in sequentially numbered chunks, and each chunk comprises at least one block. For a chunk, the method comprises the step of using first management data and second management data to record the size of space not occupied by data in the head part of the first block and in the end part of the last block of each chunk, subsequently to a deletion step of data within the file, the size of space being smaller than the size of a block. When some data of the file is deleted from the middle of a block in a chunk, move the remaining second half of data following the deleted data in the block to the position immediately following the first half of data in the block, and reorganize the block where the deletion happened and the blocks preceding it in the chunk as a first new chunk, and if there are blocks after the block where the deletion happened, reorganize those blocks as a second new chunk, use third management data and fourth management data to record the size of empty space in the head part of the first block and that in the end part of the last block in the second new chunk respectively, and link the first new chunk and the second new chunk.

In an embodiment, the first new chunk is numbered by using the number of the initial chunk before deletion, and the second new chunk is numbered following the original last chunk in the file system.

In another embodiment, link information among the chunks is recorded in file system management data.

In a fourth aspect, a file system is introduced. In the file system, a storage space for storing data of a file is divided into a plurality of blocks of identical size and sequentially numbered. Said blocks are organized in sequentially numbered chunks, and each chunk comprises at least one block. Said file system comprises management data for each chunk for indicating the size of empty storage space in the head part and/or in the end part of the chunk, wherein the size of the empty storage space is smaller than the size of a block.

In an embodiment, the size of the spaces in the head part of the first block and in the end part of the last block of the chunk is recorded by first management data and second management data.

In another embodiment, all chunks for a file are linked to keep the continuity of the file, and the link information is recorded in file system management data.

In a fifth aspect, a storage device including above file system is introduced.

DETAILED DESCRIPTION OF AN EMBODIMENT OF THE INVENTION

The exemplifications set out herein illustrate preferred embodiments of the invention, and such exemplifications should not be construed as limiting the scope of the invention in any manner.

Figure 1:
FIG. 1 is a diagram illustrating a traditional file system.
Figure 2:
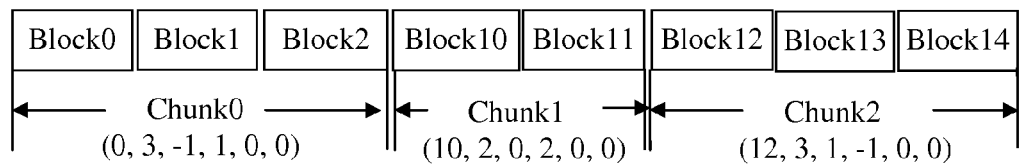
FIG. 2 is a diagram illustrating an embodiment of present file system.

In an embodiment, shown as FIG. 2, a file consists of 8 blocks with each block containing 8K bytes of data. In the file management system, the blocks belonging to a file are managed by chunks. A chunk consists of a group of blocks (at least one block). In FIG. 2, Chunk 0 consists of Blocks 0~2, Chunk 1 consists of Blocks 10~11, and Chunk2 consists of Blocks 12~14. Though in this embodiment the numbers of blocks in all chunks are different, they can be equal according to implementation. According to the present embodiment, six descriptors are used to describe each chunk. These six descriptors are: StartBlockNumber, TotalBlockNumber, PreviousChunkNumber, NextChunkNumber, UnusedSizeInFirstBlock, and UnusedSizeInLastBlock.

StartBlockNumber indicates the number of the starting block of a chunk, the TotalBlockNumber indicates the total number of blocks in a chunk, the PreviousChunkNumber indicates the number of the chunk preceding the current chunk, the NextChunkNumber indicates the number of the chunk following the current chunk, the UnusedSizeInFirstBlock shows the amount of unused space (number of bytes of space not occupied by data) in the first block of the chunk and the UnusedSizeInLastBlock shows the amount of unused space (number of bytes of space not occupied by data) in the last block of the chunk. The last two descriptors are used because after a chunk is deleted from the middle, the unused space in the last block often appears at the block where the deletion begins and the unused space in the first block often appears at the block where the deletion ends.

Turning to FIG. 2, the chunks 0~2 are described as (0, 3, −1, 1, 0, 0), (10, 2, 0, 2, 0, 0), (12, 3, 1, −1, 0, 0) respectively. The descriptors of the first chunk are (0, 3, −1, 1, 0, 0), in which the first descriptor "0" indicates that the current chunk starts with Block 0, the second descriptor "3" means that there are three blocks in the current chunk, the third descriptor "−1" indicates the chunk preceding the current chunk is NULL (since the current chunk is the first chunk in the file), the fourth descriptor "1" means that the chunk following the current chunk is Chunk 1, and fifth and the sixth descriptors "0" indicate that the unused space in the first block of the current chunk is 0 bytes and the unused space in the last block of the current chunk is 0 bytes, which means all the blocks in the Chunk 0 contain 8K bytes of data. The descriptors of Chunk1 and Chunk 2 are similar to those of Chunk 0. In this embodiment, 'NULL' is used to indicate the index of previous chunk or next chunk compared to the current chunk is invalid, which means the current chunk is either the first chunk or the last chunk of a file. For example, the index of the previous chunk of Chunk 0 is 'NULL' and the index of the next chunk of Chunk 2 is 'NULL' too.

Figure 3:
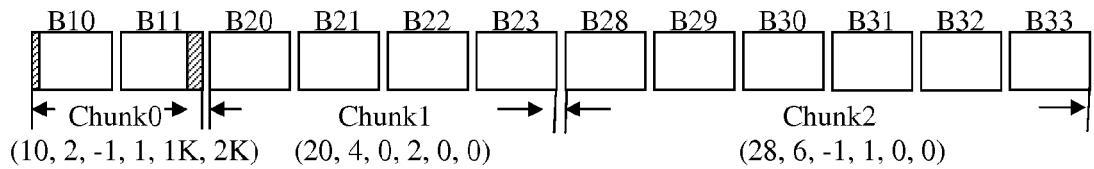
FIG. 3 is a diagram illustrating another embodiment of present file system.

In another example which is shown in FIG. 3, there are three chunks in a file, Chunk 0, Chunk 1 and Chunk 2, and they can be represented by (10, 2, −1, 1, 1024, 2048), (20, 4, 0, 2, 0, 0), and (28, 6, 1, −1, 0, 0) respectively. From the descriptors of these three chunks we can see that Chunk 0 starts at Block 10, its length is two blocks with each block being 8K (8*1024) bytes, the amount of unused space in the first block of Chunk 0 is 1K (1024) bytes, and the amount of unused space in the last block of Chunk 0 is 2K (2048) bytes. The second chunk starts at Block 20, its length is four blocks with each block being 8K (8*1024) bytes, and the amount of unused space in the first block and in the last block of the current Chunk 1 is 0, which means Chunk 1 is full of data. The third chunk starts at Block 28, its length is six blocks with each block having 8K (8*1024) bytes of data, and the number of unused data in the first block and in the last block of the current Chunk 2 is 0.

Figure 4:
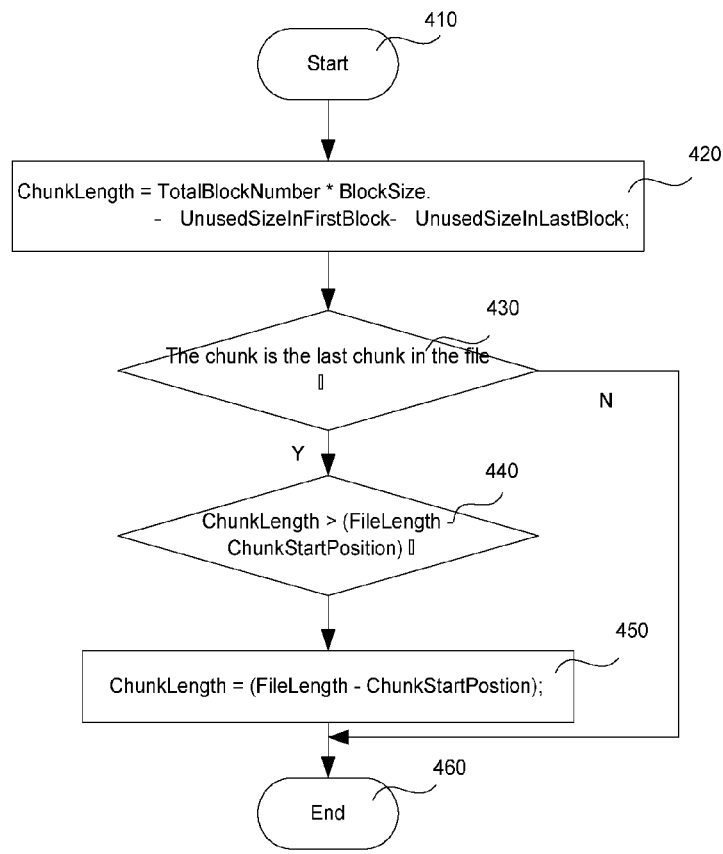
FIG. 4 is a flow chart showing how to calculate the actual size of data in a chunk when performing a reading operation using the file system according to the present embodiment.
Figure 5:
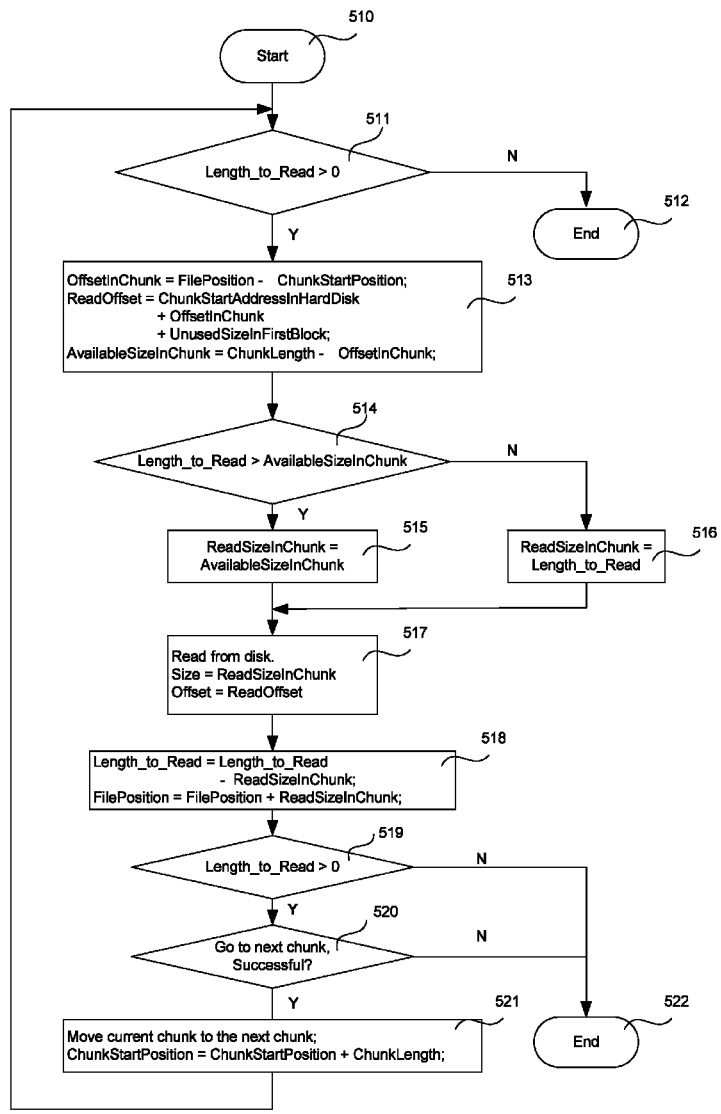
FIG. 5 is a flow chart showing an exemplary reading operation from the present file system.

FIG. 4 and FIG. 5 illustrate the detailed processes of a read operation according to the present embodiment.

FIG. 4 is a flowchart of a process for calculating the actual length or size of data in a chunk. The process starts at step 410. At step 420, the actual length of data in a chunk, ChunkLength, is calculated. ChunkLength=TotalBlockNumber*BlockSize−UnusedSizeInFirstBlock−UnusedSizeInLastBlock, where TotalBlockNumber is the total number of blocks in the current chunk. When TotalBlockNumber is multiplied by the size of each block, BlockSize (bytes), we obtain the total number of bytes occupied by the current chunk, while the size of UnusedSizeInLastBlock and UnusedSizeInFirstBlock needs to be removed from the total number of bytes occupied by the current chunk, since these spaces are actually empty. Thus we get the actual length of data in the current chunk when the current chunk is determined at step 430 that it is not the last one in the file. The process ends at the step 460. For example, the ChunkLength of the Chunk 0 is 2*8K−1K−2K=13Kbytes.

However, if the determination at step 430 is positive, the process goes to step 440 to further determine the actual length of the data of the current file occupying the current chunk. This step is used to exclude reserved space in the last chunk. When some data is written into a file system, more space will be allocated to accommodate the data so that reallocating space might not occur when further data are written to the same file after the current data. To remove the reserved size step 440 is needed. In step 440, it is determined whether the ChunkLength is larger than the difference between FileLength and ChunkStartPosition. FileLength is a parameter indicating how many bytes of data are in the current file, and ChunkStartPosition indicates where the current chunk starts or how many bytes of data precede the current chunk. We take Chunk 2 in FIG. 3 as an example. The chunk length is 6*8K=48K. The FileLength is (4+6+2)*8K−3K=93K. The starting position of Chunk 2, ChunkStartPosition, is 2*8K+4*8K−1K−2K=45Kbytes, i.e. the part of the file stored in Chunk 2 starts with an offset of 45K from the beginning of the file. If the determination at step 440 is yes, i.e. ChunkLength is larger than the difference between the FileLength and ChunkStartPosition, only ChunkLength of data will be read and the remaining data will not be considered at this time.

FIG. 5 is a flow chart elaborating an exemplary read process.

The read process starts at step 510, and it is determined whether the length of the data to be read is larger than 0 at step 511, which is a validity check. If the determination is no, this means there is no data to be read. Then the flow chart goes to step 512 and ends. If there is some data to be read, then the process goes to step 513 to calculate some parameters in preparation of reading the file. At step 513, OffsetInChunk is firstly calculated, which is a pointer indicating the offset of the reading operation in the current chunk. For example, the offset of the first available byte of data in a chunk is '0' byte, the offset of the second available byte of data in a chunk is '1' byte, etc. The OffsetInChunk=FilePosition−ChunkStartPosition. File position is the offset in a file. For example, the offset of the first available byte of data in a file is '0' byte, the second available byte of data in a file is '1' byte, etc. Take also the Chunk 0 in FIG. 3 as an example. The file is read from the first byte of data in Chunk 0. For the first byte of data in Chunk 0 also the first byte of data the file, the FilePosition is 0, the ChunkStartPosition is 0, so the OffsetInChunk is 0 too. If the file were read from the fifth byte of data, then the FilePosition would be 5 bytes and the ChunkStartPosition would be 0 byte. So the OffsetInChunk is 5 bytes. Then the physical position of the first byte of data in Chunk 1 is calculated, which is ReadOffset=ChunkStartAddressInHardDisk+OffsetInChunk+UnusedSizeInFirstBlock. ChunkStartAddressInHardDisk is the address of the current chunk on the hard disk. So for Chunk 1, the UnusedSizeInFirstBlock is 1 KB, and the ReadOffset is ChunkStartAddressHardDisk plus 1 KB, which means the application first finds the physical position of Chunk 1, then moves by 1 KB offset and gets to the actual position of the data to be read. It is also determined how much available data can be read from the current chunk: AvailableSizeInChunk=ChunkLength−OffsetInChunk. For Chunk 1, the AvailableSizeInChunk is 13 Kbytes.

It is further determined at step 514 whether the quantity of data to be read, Length_to_Read, is larger than the available data, AvailableSizeInChunk in the current chunk. This step is used to determine whether reading from the current chunk is enough. If more data needs to be read, i.e. yes at step 514, all the data in the current chunk needs to be read out first. Set ReadSizeInChunk=AvailableSizeInChunk at step 515. If the determination at step 514 is no, which means there is less data to be read than the quantity of data available in the current chunk, then the flow chart goes to step 516 to set the Length_to_Read to ReadSizeInChunk. After the processes at step 515 and 516, the process goes to step 517 to perform the reading operation, reading ReadSizeInChunk of data from the position ReadOffset. After the read operation, the process goes to step 518 to update the parameters Length_to_Read and FilePosition, in which the Length_to_Read is updated to Length_to_Read−ReadSizeInChunk, since ReadSizeInChunk of data has been read out per the processes above, and the FilePosition=FilePosition+ReadSizeInChunk.

Further, at step 519 it is determined whether the data of the file has been totally read out. If the determination is yes, i.e, the updated Length_to_Read is larger than 0, not all the data of the current file has been read out and the application moves to the next chunk to perform the subsequent read process at steps 520 and 521. And at step 521, the ChunkStartPosition is updated to the previous ChunkStartPosition plus the previous ChunkLength, which is the ChunkStartPosition of the next chunk. If the determination at step 519 is no, which means all the data of the current file has been read out, the process ends at step 522.

Figure 6:
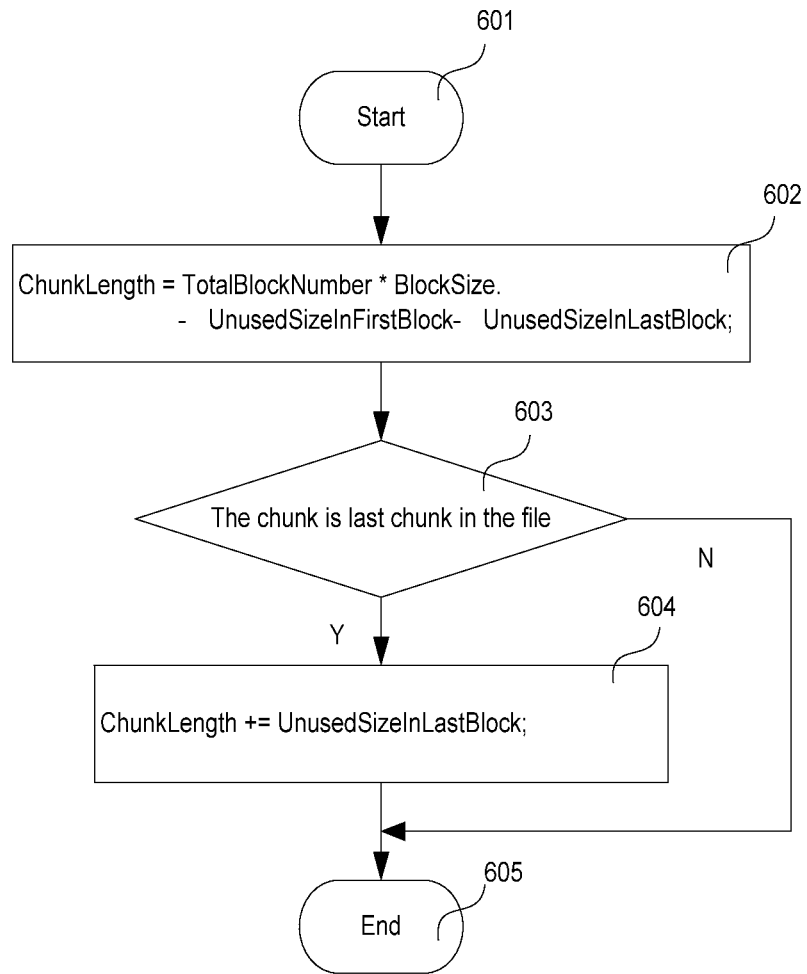
FIG. 6 is a flow chart showing how to calculate the actual size of data in a chunk when performing a writing operation from the present file system.
Figure 7:
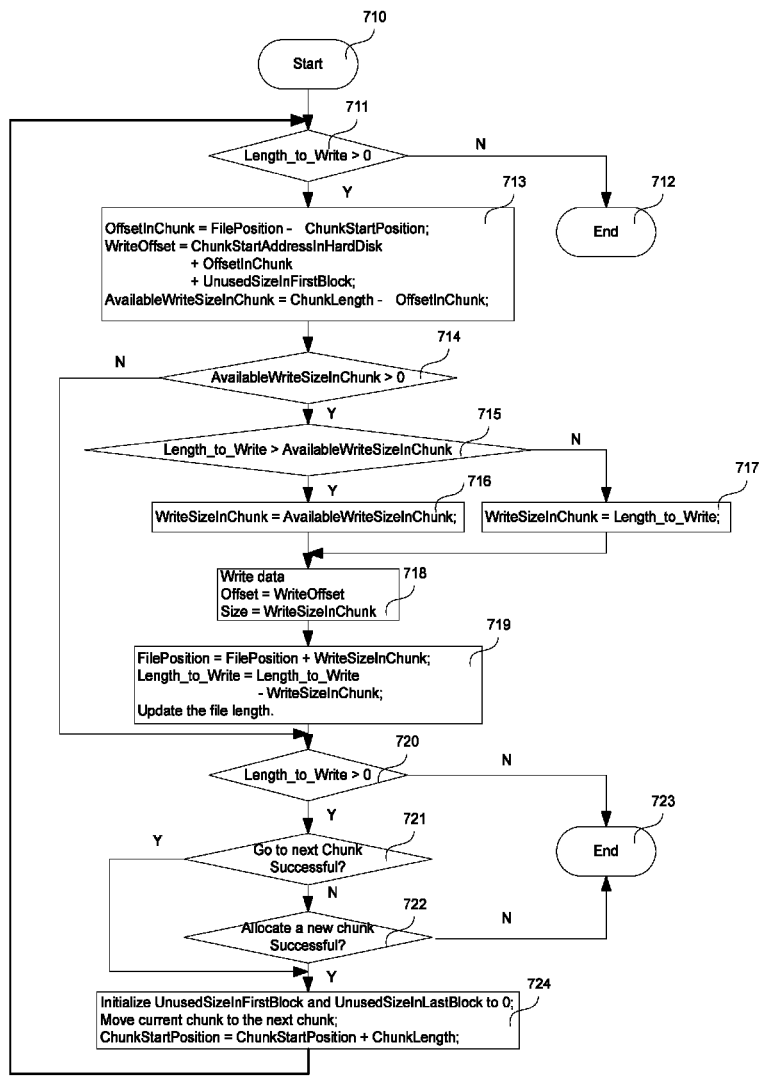
FIG. 7 is a flow chart showing an exemplary writing operation to the present file system.

With reference to FIG. 6 and FIG. 7, we explain an exemplary writing operation. Signs/labels/identifiers similar with those in FIG. 4 and FIG. 5 will not be further elaborated.

FIG. 6 shows a flow chart illustrating the calculation of the available amount of free space that can be used to write data in a chunk. The process starts at step 601. At step 602, the actual length of data in the current chunk is determined, which is similar with the operation during the read process of FIG. 4 and will not be described in more detail here. Then at step 603, it is determined whether the current chunk is the last chunk in the file. If the determination is no, the process goes to step 605 and ends. If the determination is yes, the process goes to step 604, where the free space available in the current chunk is the value gotten from step 602 plus the value UnusedSizeInLastBlock of the last chunk of the file.

In FIG. 7, a detailed writing process is shown.

The writing process starts at step 710 and then goes to step 712 where it is determined whether the length of data to be written is valid. If the determination is no, the process goes to step 712 and ends. If yes, the process goes to step 713 to calculate the position to be written in the current chunk, the position mapped to the hard disk, and how many bytes of data can be written into the current chunk. These three values are represented by OffsetInChunk, WriteOffset, and AvailableWriteSizeInChunk. The calculation of OffsetInChunk here is the same as that during the read process. However, the OffsetInChunk here is used to calculate the position where the writing process is starting in the current chunk. WriteOffset indicates the actual physical position to write the current file and its calculation process is similar to the ReadOffset during the read process of FIG. 4. AvailableWriteSizeInChunk shows the size can be written in the current chunk, whose calculation process is similar with AvailableSizeInChunk during the read process, except that the ChunkLength is calculated using the process in FIG. 6. At step 714 it is determined whether there is space in the current chunk to which data can be written, that is whether the AvailableWriteSizeInChunk is larger than 0. If no, the process goes to 720 to further consider the possibility of using the next chunk. If the determination at step 714 is yes, then it is determined at step 715 whether the length of the data to write, Length_to_Write is larger than the size that can be used for the writing operation, AvailableWriteSizeInChunk. If the determination at step 715 is yes, which means the size can be written in the current chunk is not enough for the data to be written, so more chunks are needed. Then the process goes to step 716 and data with the size AvailableWriteSizeInChunk is set to WriteSizeInChunk for the writing operation at step 718. If the determination is no, this means there is enough space for the data to be written into the current chunk. At step 717, set Length_to_Write to WriteSizeInChunk and the process goes to step 718 where WriteSizeInChunk of data is written from the position WriteOffset.

Subsequently, the original FilePosition moves to the position determined by the original FilePosition+WriteSizeInChunk. The size of the remaining data to be written of the file is changed to the original Length_to_Write diminished by WriteSizeInChunk (already written into the chunks).

Since more chunks may be needed for the subsequent writing process according to the determination at step 715, it is then determined at step 720, whether there is still some data to be written. If the answer is yes, then move to the next chunk to perform the writing process, as shown in steps 721 and 722. At step 724, the UnusedSizeInFirstBlock and UnusedSizeInLastBlock is initialized to 0 and move to the next chunk. The point to the position where the writing operation starts is changed to ChunkStartPosition=ChunkStartPosition+ChunkLength.

There is another important process: deleting data from the file system. This important process is shown in FIGS. 8~11.

Figure 8:
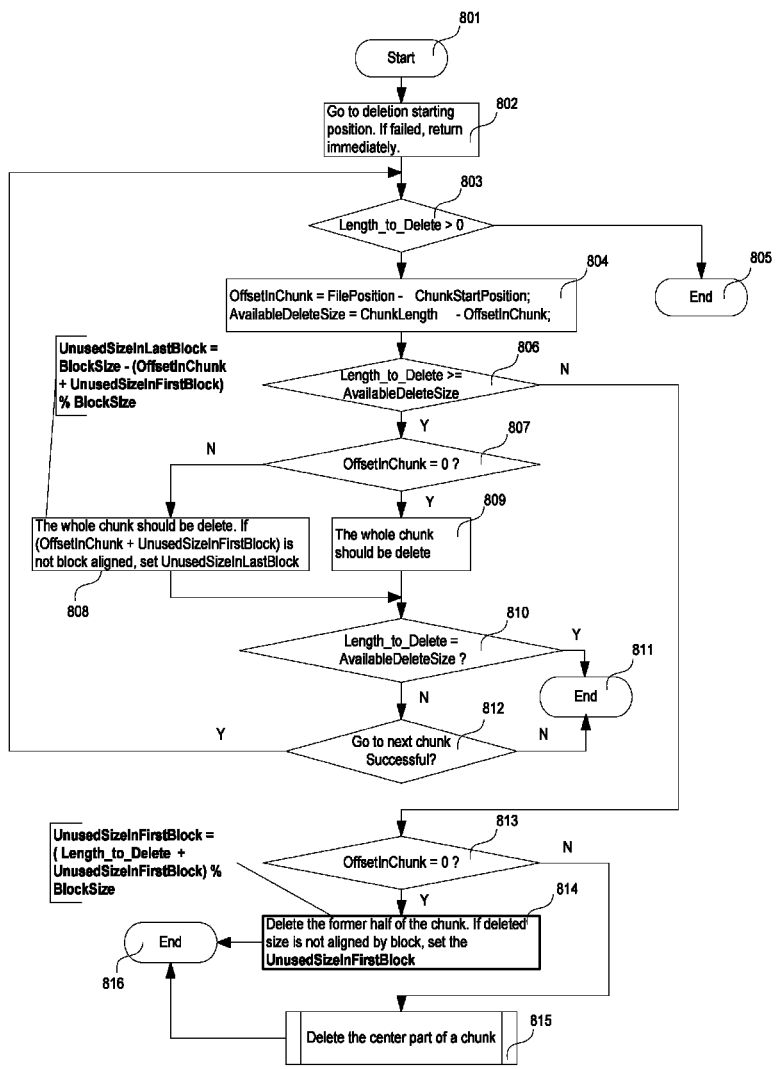
FIG. 8 is a flow chart showing an exemplary data removal operation in the present file system.

FIG. 8 is a flow chart illustrating an exemplary deletion operation process. This process starts at step 801. At step 802, there is a determination to find out the position at which the deletion starts. This step is a validity check process. After that, it is determined whether the length of data to be deleted is a valid value (step 803). If no, the process goes to 805 and ends. If yes, the position, OffsetInChunk where the deletion starts and the length of data to be deleted from the current chunk are determined at step 804. OffsetInChunk is calculated by using formula OffsetInChunk=FilePosition−ChunkStartPosition, and AvailableDeleteSize is calculated by the formula AvailableDeleteSize=ChunkLength−OffsetInChunk. Then the process goes to step 806 where it is determined whether the length of data to be deleted, Length_to_Delete is not less than the size of the available data in the current chunk. If the determination at step 806 is no, this means that there is enough data in the current chunk available for deletion. Then the process goes through steps 813-816 to carry out the deletion operation.

At step 813, it is determined whether OffsetInChunk is equal to 0. This step is to decide whether the deletion process starts from the first byte of data of the chunk. If the determination is no, which means the deletion operation of the current chunk should start from middle of the current chunk, the process goes to step 815 where data of the current chunk is deleted from a position indicated by OffsetInChunk. At the same time, because the determination at step 806 is no, there is hence more data available in the current chunk than the length of data needed for deletion and there should be some data left in the current chunk. In this case, only a central part of the current chunk is deleted at the step 815 and the process ends at step 816. If the determination at step 813 is yes, this means the deletion operation starts from the beginning of the current chunk. Since the result of the determination at step 806 is negative, there is more available data than the quantity of data to be deleted, the head part of the current chunk is deleted at step 814. When performing the deletion operation from the head part of the current chunk, the head part of the first block among the remaining current blocks may be partly deleted. This block then becomes a partially filled block; in other words it is not aligned. There will be a new UnusedSizeInFirstBlock describing the size of the unused head part of the remaining first block of the current chunk. The new UnusedSizeInFirstBlock is calculated by using the following function: UnusedSizeInFirstBlock=(Length_to_Delete+UnusedSizeInFirstBlock)%BlockSize. (Length_to_Delete+UnusedSizeInFirstBlock) indicating the length of the area to be released. The '%' operation corresponds to getting the arithmetical complement of a division. If the arithmetical complement is not zero, it means there is space that is not occupied by data in the head part of the first block of the remaining chunk after deletion. An example is shown in FIG. 9.

Figure 9:
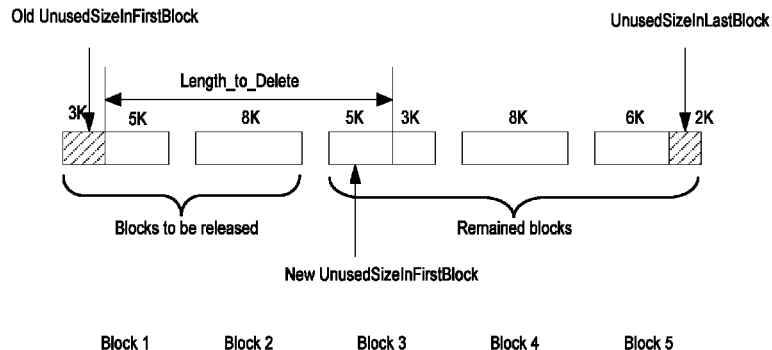
FIG. 9 illustrates an exemplary data removal operation cutting data from the beginning of a chunk.

In FIG. 9, there are five blocks in the current chunk, which are Blocks 1~5. There is a 3 Kbytes unused space at the header of the Block 1 and a 2 Kbytes unused space at the end of the Block 5. That is the UnusedSizeInFirstBlock of the current chunk is 3 Kbytes and the UnusedSizeInLastBlock of the current chunk is 2 Kbytes. The deletion starts from the first data in Block 1, and 18 Kbytes of data will be deleted. So the Length_to_Delete will be 18 Kbytes. After the deletion, Blocks 1~2 will be released since they are totally deleted, the UnusedSizeInLastBlock for the chunk after deletion will be the same as that of the original chunk before the deletion, and the UnusedSizeInFirstBlock will be changed to (Length_to_Delete+UnusedSizeInFirstBlock)%BlockSize=(18+3)%8=5 Kbytes.

Figure 10:
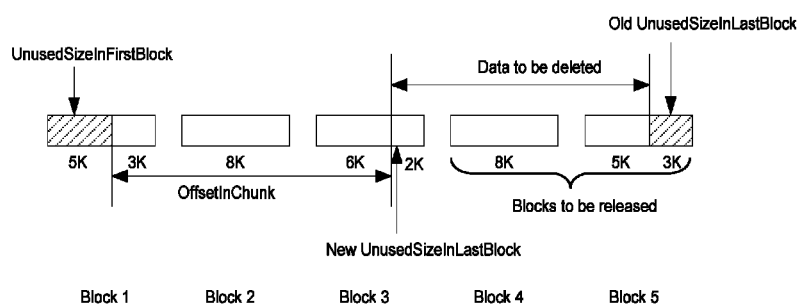
FIG. 10 illustrates an exemplary data removal operation cutting data from the end of a chunk.

If the determination at step 806 is positive, the deletion of the entire current chunk is not enough. In this case, the process goes to step 807, where it is determined whether the deletion of current chunk is to be made from the beginning or from the middle. If the determination is negative, the deletion operation is from somewhere in the middle of the current chunk, and the process goes to step 808 for deletion of the space in the chunk from the OffsetInChunk position. Since the determination at step 806 is yes, showing the data from the current OffsetInChunk should be deleted, and some data at the beginning of the chunk still remain, if the total number of UnusedSizeInFirstBlock of the current chunk together with the size OffsetInChunk of data does not consist a full block (full of 8 Kbytes), there should be some unused space at the end of current chunk, so at the step 808, the new UnusedSizeInLastBlock of the current chunk is calculated by using the following function: UnusedSizeInLastBlock=BlockSize−(OffsetInChunk+UnusedSizeInFirstBlock)%BlockSize. Here 'OffsetInChunk+UnusedSizeInFirstBlock' means some data still remains in the chunk. The '%' operation obtains the arithmetical complement of the division. After the '%' operation, the remaining quantity of data in the new last block is obtained. It is subtracted from BlockSize to get the unused size in the last block. FIG. 10 is an example illustrating this process.

In FIG. 10, there are five blocks, Blocks 1~5 in the current chunk. There is 5 Kbytes of unused space at the head part of Block 1, and 3 Kbytes of used space at the end part of the Block 5. So the UnusedSizeInFirstBlock is 5 Kbytes and the UnusedSizeInLastBlock is 3 Kbytes. A deletion operation starts from the 6 Kbytes in Block 3 and 15 Kbytes of data will be deleted. The OffsetInChunk will be 17 Kbytes. After the deletion, Blocks 4~5 will be released, the UnusedSizeInFirstBlock will not change for the current chunk, and there will be a new UnusedSizeInLastBlock value. This new value will be BlockSize−(OffsetInChunk+UnusedSizeInFirstBlock) %BlockSize=8K−((17+5)%8) K=8K−6K=2 Kbytes.

However, if the determination at step 807 is positive, the deletion operation starts from the beginning of the current chunk. Because the termination at step 806 is yes for the step 807, the whole chunk is deleted at step 809. After this operation the process goes to the next chunk and returns to step 803.

Figure 11:
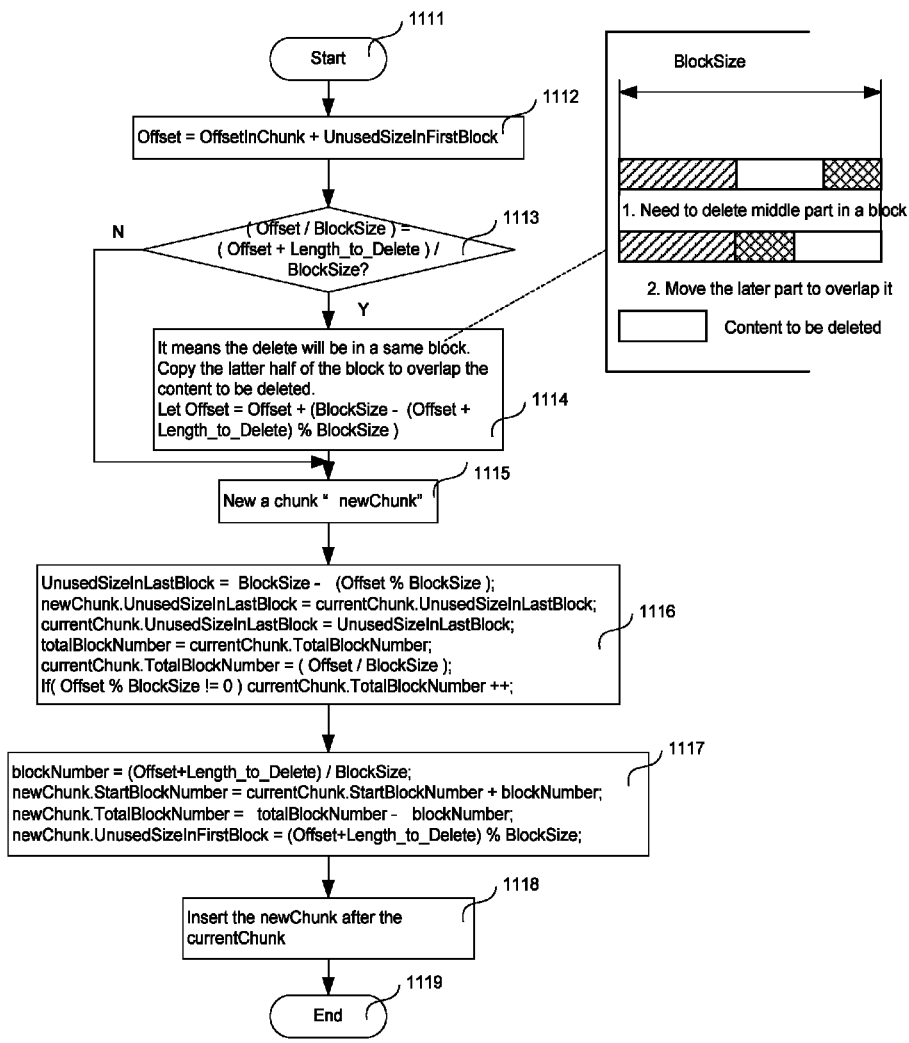
FIG. 11 is a flow chart showing an exemplary data removal operation cutting data from middle part of a chunk.

If the deletion in FIG. 8 is deleting a central part of a chunk, i.e. the process at step 815, the chunk is separated into two chunks. FIG. 11 illustrates operations handling this condition. The process starts at step 1111. At step 1112, descriptor 'Offset' is calculated by Offset=OffsetInChunk+UnusedSizeInChunk. Then it is determined at step 1113 whether the deletion is carried on a same block in the chunk, i.e. deleting a central part of a block. The determining method is to determine whether (Offset/BlockSize)=(Offset+Length_to_Delete)/BlockSize. Here, '/' is an operation which will get the integral part of the result. If the determination at step 1113 is no, it means some whole blocks of the chunk are deleted from the central part of the current chunk and the current chunk is separated into two chunks. If the determination at step 1113 is positive, the deletion operation occurs in the central part of a block. The process goes to step 1114, where the latter part of the block will be copied and used to overwrite the content to be deleted, with the value of the Offset being updated by the original value of Offset plus (BlockSize−(Offset+Length_to_Delete)%BlockSize). After the processes at step 1115, the values of some identifiers are updated at steps 1116 and 1117.

The descriptors of the new chunk will be set up and some of the descriptors of the original chunk will be changed during step 1116 and 1117.

Figure 12:
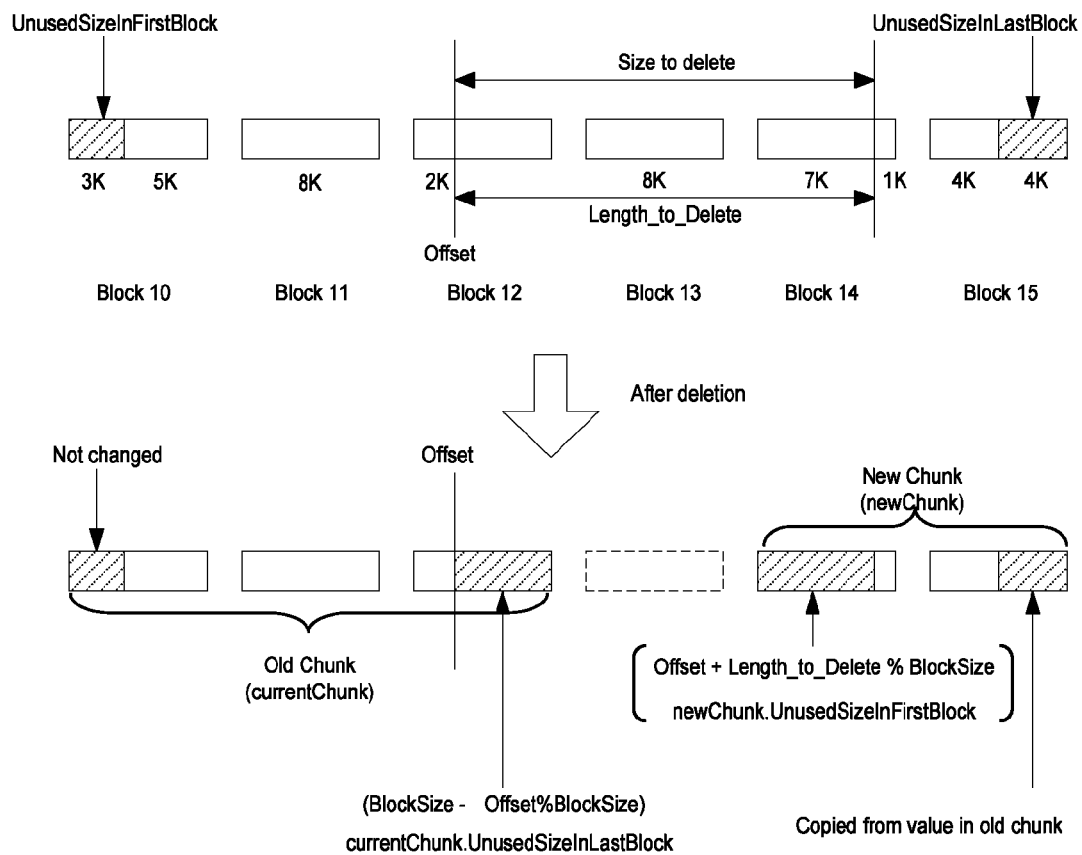
FIG. 12 illustrates an exemplary data removal operation cutting data from middle part of a chunk.

These processes during steps 1116 and 1117 will be further described combined with FIG. 12. In FIG. 12, there are six blocks in the current chunk, e.g. Chunk 5, with the StartBlockNumer being Block 10, the TotalBlockNumber being 6 blocks, the PreviousChunkNumber being Chunk 4, the NextChunkNumber being Chunk 6, UnusedSizeInFirstBlock being 3 Kbytes and the UnusedSizeInLastBlock being 4 Kbytes.

When performing the deletion operation, the OffsetInChunk is 15 kbytes and the Length_to_Delete is 21 Kbytes, which means 21 Kbytes of data will be deleted from the position after 15 Kbytes. So the Offset is OffsetInChunk+UnusedSizeInFirstBlock=15K+3K=18 Kbytes. According to step 1113, because (Offset/Block)=(18K/8K)≠((Offset)+Length_to_Delete)=((18K+21K)/8K), the deletion doesn't occur in a single chunk. After the deletion, the original Chunk 5 is changed to a new Chunk 5 and another chunk, for example Chunk 8, if there are 7 chunks in the original file system. For the new Chunk 5, the StartBlockNumer is not changed. Since at step 1116, (Offset%BlockSize)=(18K%8K)=2≠0, ((Offset/BlockSize)+1) will be the TotalBlockNumber of the new Chunk 5, which is changed to 3 blocks. The PreviousChunkNumber of the new Chunk 5 will be the same as that of the original Chunk 5. The NextChunkNumber is changed to Chunk 8. The UnusedSizeInFirstBlock of the new Chunk 5 is the same with that of the original Chunk 5. And the UnusedSizeInLastBlock of the new Chunk 5 will be BlockSize−(Offset%BlockSize)=8K−(18%8)K=8K−2K=6 Kbytes.

For the Chunk 8, the StartBlockNumer is the StartBlockNumber of the new Chunk 5 plus (Offset+Length_to_Delete)/BlockSize, which is 10+(18K+21K)/8K=10+4=14, i.e. Block 14. The TotalBlockNumber is the TotalBlockNumber of the original Chunk 5 subtracts (Offset+Length_to_Delete)/BlockSize. That is 6−4=2, i.e. there are 2 blocks in the Chunk 8. The PreviousChunkNumber of Chunk 8 is Chunk 5 and the NextChunkNumber is Chunk 6. The UnusedSizeInFirstBlock of the Chunk 8 is (Offset+Length_to_Delete)%BlockSize=(18+21)%8=7 Kbytes, and the UnusedSizeInLastBlock has the same size with the original Chunk 5, which is 4 Kbytes. The Block 13 is totally deleted from the file system so this space will be released.

Above described file system can be a PVR file system in Set Top Box and other devices.

A number of implementations have been described. Nevertheless, it will be understood that various modifications may be made. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application and are within the scope of the following claims.

The invention claimed is:

1. A method for managing data of a file in a file system, wherein a storage space for storing the data of the file is divided into a plurality of blocks of identical size and sequentially numbered, wherein said blocks being organized in sequentially numbered chunks, and each chunk comprising at least one block, for a chunk, the method comprising the step of:
   using first management data and second management data to record the size of space not occupied by data in the head part of the first block and in the end part of the last block of each chunk, subsequently to a deletion step of data within the file, the size of space being smaller than the size of a block.

2. The method according to claim 1, wherein the deletion step comprises deleting data from the head part or from the end part of the chunk.

3. The method according to claim 1, wherein chunks comprising data of a given file are linked, and wherein the link information is recorded in file system management data.

4. The method according to claim 1, wherein if a chunk is totally deleted, the storage space for the deleted chunk will be released and the chunks preceding and following the deleted chunk are linked.

5. A method according to claim 1, further comprising the steps:
   when part of the file is deleted, and the deletion starting position and ending position are not in a same block but within a same chunk, the chunk is separated into a first new chunk and a second new chunk,
   using third management data and fourth management data to record the size of empty space in the head part of the first block and that in the end part of the last block in the second new chunk respectively, and
   linking the first new chunk and the second new chunk to keep the continuity of the file.

6. The method according to claim 5, wherein the first new chunk is numbered by using the number of the initial chunk before deletion, and the second new chunk is numbered following the original last chunk in the file system.

7. The method according to claim 5, wherein if data in a block is totally deleted, the space of the block is released.

8. A method for managing data of a file in a file system according to claim 1, further comprising the steps of
when some data of the file is deleted from the middle of a block in a chunk,
moving the remaining second half of data following the deleted data in the block to the position immediately following the first half of data in the block,
reorganizing the block where the deletion happened and the blocks preceding it in the chunk as a first new chunk, and if there are blocks after the block where the deletion happened, reorganizing those blocks as a second new chunk,
using third management data and fourth management data to record the size of empty space in the head part of the first block and that in the end part of the last block in the second new chunk respectively, and
linking the first new chunk and the second new chunk.

9. The method according to claim 8, wherein the first new chunk is numbered by using the number of the initial chunk before deletion, and the second new chunk is numbered following the original last chunk in the file system.

10. The method according to claim 8, wherein link information among the chunks is recorded in file system management data.

11. A file system including a non-transitory storage medium, wherein a storage space in the storage medium for storing data of a file is divided into a plurality of blocks of identical size and sequentially numbered, wherein said blocks are organized in sequentially numbered chunks, and each chunk comprises at least one block, said file system comprising management data for each chunk for recording the size of empty storage space in at least one of the head part or the end part of the chunk, wherein the size of the empty storage space is smaller than the size of a block.

12. The file system according to claim 11, wherein the size of the spaces in the head part of the first block and in the end part of the last block of the chunk is recorded by first management data and second management data.

13. The file system according to claim 12, wherein all chunks for a file are linked to keep the continuity of the file, and the link information is recorded in file system management data.

14. A storage device including the file system of claim 11.

* * * * *